US009510404B2

(12) United States Patent
Zhang et al.

(10) Patent No.: US 9,510,404 B2
(45) Date of Patent: Nov. 29, 2016

(54) BACKLIGHT DRIVE CIRCUIT, METHOD FOR DRIVING THE SAME, AND LIQUID CRYSTAL DISPLAY DEVICE

(71) Applicant: Shenzhen China Star Optoelectronics Technology Co., Ltd., Shenzhen, Guangdong (CN)

(72) Inventors: Hua Zhang, Guangdong (CN); Fei Li, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 0 days.

(21) Appl. No.: 14/417,653

(22) PCT Filed: Jan. 13, 2015

(86) PCT No.: PCT/CN2015/070633
§ 371 (c)(1),
(2) Date: May 4, 2016

(87) PCT Pub. No.: WO2016/101362
PCT Pub. Date: Jun. 30, 2016

(65) Prior Publication Data
US 2016/0249420 A1 Aug. 25, 2016

(30) Foreign Application Priority Data

Dec. 24, 2014 (CN) .......................... 2014 1 0817656

(51) Int. Cl.
*G09G 3/36* (2006.01)
*H05B 33/08* (2006.01)
*G02F 1/1335* (2006.01)
*G09G 3/34* (2006.01)
*G09G 3/00* (2006.01)

(52) U.S. Cl.
CPC ..... *H05B 33/0815* (2013.01); *G02F 1/133603* (2013.01); *G09G 3/3406* (2013.01); *G09G 3/003* (2013.01); *G09G 2310/024* (2013.01); *G09G 2320/0233* (2013.01); *G09G 2320/041* (2013.01); *G09G 2320/064* (2013.01); *G09G 2330/045* (2013.01)

(58) Field of Classification Search
CPC ...................................................... G09G 3/342
USPC .......................... 345/102; 315/210, 246, 291
See application file for complete search history.

(56) References Cited

U.S. PATENT DOCUMENTS 8,264,451 B2 * 9/2012 Kimura .................. G09G 3/342
345/102
8,400,392 B2 * 3/2013 Kimura ................ G09G 3/3426
345/102

(Continued)

FOREIGN PATENT DOCUMENTS

| CN | 101281734 A | 10/2008 |
|---|---|---|
| CN | 201654394 U | 11/2010 |
| JP | 2009003270 A | 1/2009 |

OTHER PUBLICATIONS

International Search Report and Written Opinion, China, Jan. 13, 2015.

*Primary Examiner* — Thuy Vinh Tran
(74) *Attorney, Agent, or Firm* — Kim Winston LLP

(57) ABSTRACT

Related to is a backlight drive circuit and a method for driving the backlight drive circuit, and a resulting liquid crystal display device. The backlight drive circuit comprises a plurality of light emitting cells divided into several backlight partitions in an even manner; pulse dimming signal units of a same number with the backlight partitions, each of the pulse dimming signal units outputting a pulse dimming signal; and a plurality of backlight drive units, each of which is electrically connected to all of the pulse dimming signal units to receive respective pulse dimming signals output by the pulse dimming signal units, and meanwhile each of which is further electrically connected to an identical number of light emitting cells in all of the backlight partitions. When a pulse dimming signal is output from a pulse dimming signal unit, all of the backlight drive units supply power to their respectively connected light emitting cells in a corresponding backlight partition, so as to drive said light emitting cells to emit light.

19 Claims, 3 Drawing Sheets

(56) References Cited

U.S. PATENT DOCUMENTS

| | | | |
|---|---|---|---|
| 8,619,017 B2* | 12/2013 | Kimura | G09G 3/3426 345/102 |
| 9,230,489 B2* | 1/2016 | Yamazaki | G09G 3/342 |
| 2008/0174544 A1* | 7/2008 | Ueda | G09G 3/3426 345/102 |
| 2011/0141152 A1* | 6/2011 | Park | G09G 3/342 345/690 |
| 2013/0120481 A1 | 5/2013 | Murai | |

* cited by examiner

BACKLIGHT DRIVE CIRCUIT, METHOD FOR DRIVING THE SAME, AND LIQUID CRYSTAL DISPLAY DEVICE

COSS-REFERENCE TO RELATED APPLICATIONS

The present application claims benefit of Chinese patent application CN 201410817656.2, filed on Dec. 24, 2014, and entitled "BACKLIGHT DRIVE CIRCUIT, METHOD FOR DRIVING THE SAME, AND LIQUID CRYSTAL DISPLAY DEVICE," the entire disclosure of which is hereby incorporated by reference.

FIELD OF THE INVENTION

The present disclosure relates to a backlight driving technology for a liquid crystal display device, and in particular, to a backlight drive circuit applicable to a large-sized liquid crystal display device and a method for driving the large-sized liquid crystal display device, and a resulting liquid crystal display device.

BACKGROUND OF THE INVENTION

In general, there are a very large number of LED strips in a large-sized liquid crystal display device, and the power consumed thereby is also considerably high. When the large-sized liquid crystal display device operates in a three-dimensional scan mode, the LED strips, from top to bottom, are divided into a plurality of backlight partitions, and each of the backlight partitions contains an identical quantity of LED strips. The LED strips in one backlight partition are actuated by one or more related LED backlight drive units. In other words, the LED strips actuated by one LED backlight drive unit are gathered into one and the same backlight partition. When the backlight partitions are scanned, from top to bottom, in the liquid crystal display device one by one, the backlight partitions emit light respectively in terms of transmission of a three-dimensional image display signal. Moreover, the LED strips in only one backlight partition may emit light at every turn and are powered by a correlated LED backlight drive unit for lightening, whereas the rest of the LED backlight drive units are all under a suspended state. Such an operating manner may lead to a localized high temperature in a backlight drive circuit, so that heat throughout an entire backlight module is distributed unevenly, which is very likely to cause damage to circuit elements. In addition, since there are always several LED backlight drive units under the suspended state, the efficiency of the entire backlight drive circuit is inevitably low.

SUMMARY OF THE INVENTION

Aiming to solve the above problems, the present disclosure provides a backlight drive circuit with power consumption distributed evenly and a method for driving the backlight drive circuit, and a corresponding liquid crystal display device.

Provided in the present disclosure is a backlight drive circuit, comprising: a plurality of light emitting cells, divided into several backlight partitions in an even manner; pulse dimming signal units of a same number with the backlight partitions, each of the pulse dimming signal units outputting a pulse dimming signal; and a plurality of backlight drive units, each of which is electrically connected to all of the pulse dimming signal units to receive respective pulse dimming signals output by the pulse dimming signal units, and meanwhile each of which is further electrically connected to an identical number of light emitting cells in all of the backlight partitions. When a pulse dimming signal is output from a pulse dimming signal unit, all of the backlight drive units supply power to their respectively connected light emitting cells in a backlight partition, so as to drive said light emitting cells to emit light.

According to an embodiment of the present disclosure, all of the backlight drive units supply identical power to their respectively connected light emitting cells in said backlight partition, so as to drive said light emitting cells to emit light.

According to a further embodiment of the present disclosure, each of the backlight drive units is electrically connected to one or more light emitting cells in each of the backlight partitions.

According to an embodiment of the present disclosure, the above backlight drive circuit further comprises a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

According to an embodiment of the present disclosure, the light emitting cell is a light strip composed of a plurality of light emitting diodes in series connection to one another.

According to an embodiment of the present disclosure, an anode of the light emitting cell is electrically connected to the DC converter, and a cathode thereof is electrically connected to a first terminal of a switch transistor, a second terminal of the switch transistor being electrically grounded via a voltage dividing resistor and a control terminal thereof being electrically connected to an output terminal of the backlight drive unit.

According to an embodiment of the present disclosure, each of the above backlight drive units is also electrically connected between the switch transistor and the voltage dividing resistor to obtain a feedback voltage from the light emitting cells.

Further, the present disclosure also provides a method for driving the above backlight drive circuit, comprising steps of: dividing the light emitting cells into several backlight partitions in an even manner; and supplying, by all of the backlight drive units, when a pulse dimming signal is output from a pulse dimming signal unit, electrical power to their respectively connected light emitting cells in a corresponding backlight partition, so as to drive the light emitting cells to emit light.

Further, the present disclosure also provides a liquid crystal display device comprising the above-mentioned backlight drive circuit.

Compared with the prior art, the beneficial effects provided by one or more embodiments of the present disclosure are as follows.

1. The backlight drive circuit proposed in the present disclosure comprises a plurality of backlight drive units, wherein each of the backlight drive units receives all of the pulse dimming signals, and electrically connected to an identical number of light emitting cells in all of the backlight partitions. When a pulse dimming signal is received, all of the backlight drive units supply power to drive said light emitting cells in a corresponding backlight partition to emit light. As a result, when the partitions are scanned, from top to bottom, in the liquid crystal panel on by one, each of the backlight drive units may undergo permanently a power outputting condition, so that the operating efficiency of the entire backlight drive circuit can be improved.

2. The backlight driving method provided in the present disclosure aims at simultaneous operations of all the backlight drive units to drive the backlight partitions to be lightened in sequence while the liquid crystal display panel scans these partitions from top to bottom one by one. And, when a particular partition performs light emission, all of the backlight drive units can supply the same or roughly the same power to this backlight partition. As such, there is no difference in operating states between these backlight drive units, such that the entire backlight drive circuit operates stably, and those abnormal circuit conditions due to the operating state difference in the prior art can be effectively avoided.

3. The backlight drive circuit provided in the present disclosure has an even heat distribution, so that damage to circuit elements due to local overheating may be avoided.

The present disclosure is particularly applicable to a large-sized liquid crystal display device.

BRIEF DESCRIPTION OF THE DRAWINGS

The drawings are provided for further understanding of the present disclosure, and constitute a part of the description to interpret the present disclosure together with the embodiments of the present disclosure, rather than limit to the present disclosure, wherein.

DETAILED DESCRIPTION OF THE EMBODIMENTS

Figure 1:
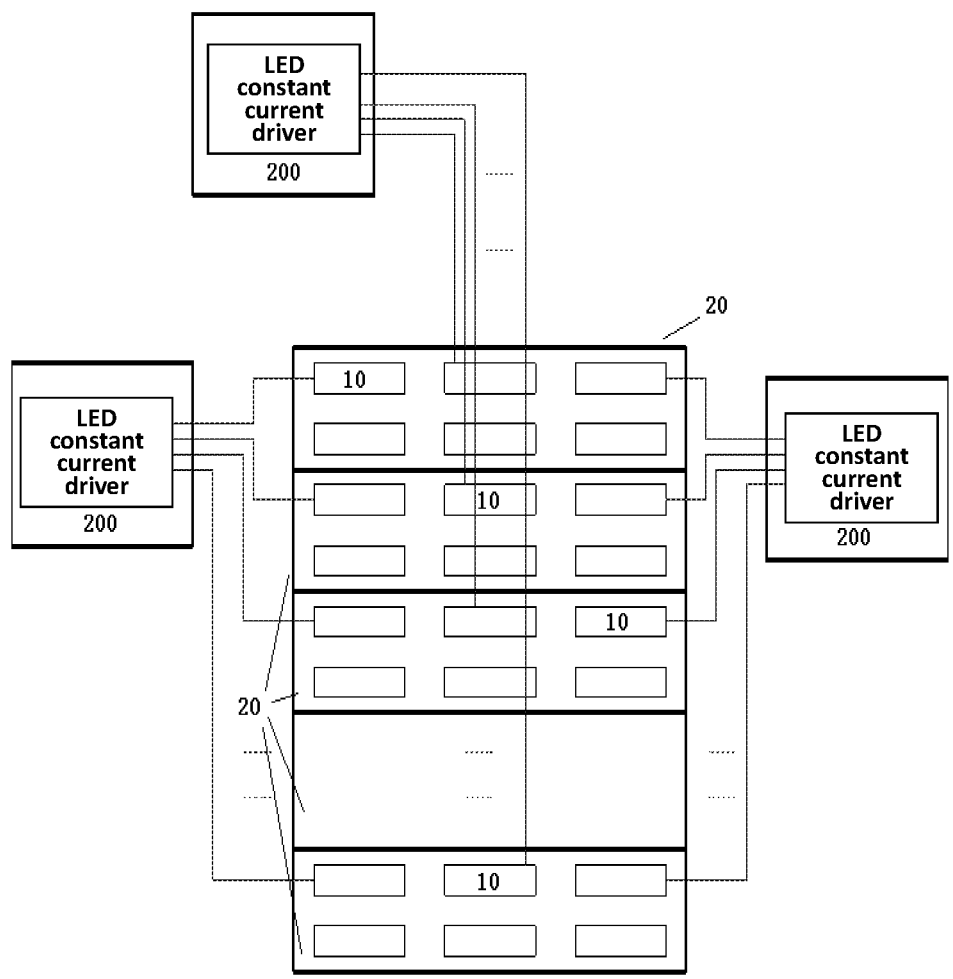
FIG. 1 is a diagram of structure of a backlight drive circuit according to the present disclosure.

FIG. 1 is a structural diagram of a backlight drive circuit according to the present disclosure. As described above, a liquid crystal display panel using such a circuit for backlight driving may be, for example, a large-sized liquid crystal display panel which is based on LED backlight display technology. When such a large-sized liquid crystal display panel is operating in a three-dimensional scan mode, LED strips 10 may be divided, from top to bottom, into a plurality of backlight partitions 20, and all of the backlight partitions 20 contain an identical quantity of LED strips 10. During transmission of a three-dimensional image display signal, the backlight partitions may be lightened respectively in terms of transmission of the three-dimensional image display signal. A main idea of the technical solution provided by the present disclosure is that each backlight partition, whenever lightened, would be supplied with the power required for its lightening from all of the LED backlight drive units.

To achieve the above objective, the following improvements are made by the present disclosure over a backlight drive circuit of the prior art. That is, light emitting cells controlled by one backlight drive unit are no longer gathered into one and the same backlight partition. Instead, the plurality of emitting cells in one backlight partition is electrically connected to various backlight drive units and actuated thereby. For better understanding the purpose, the technical solution and advantages of the present disclosure, detailed explanation may be made to the embodiments with reference to the following drawings.

Figure 2:
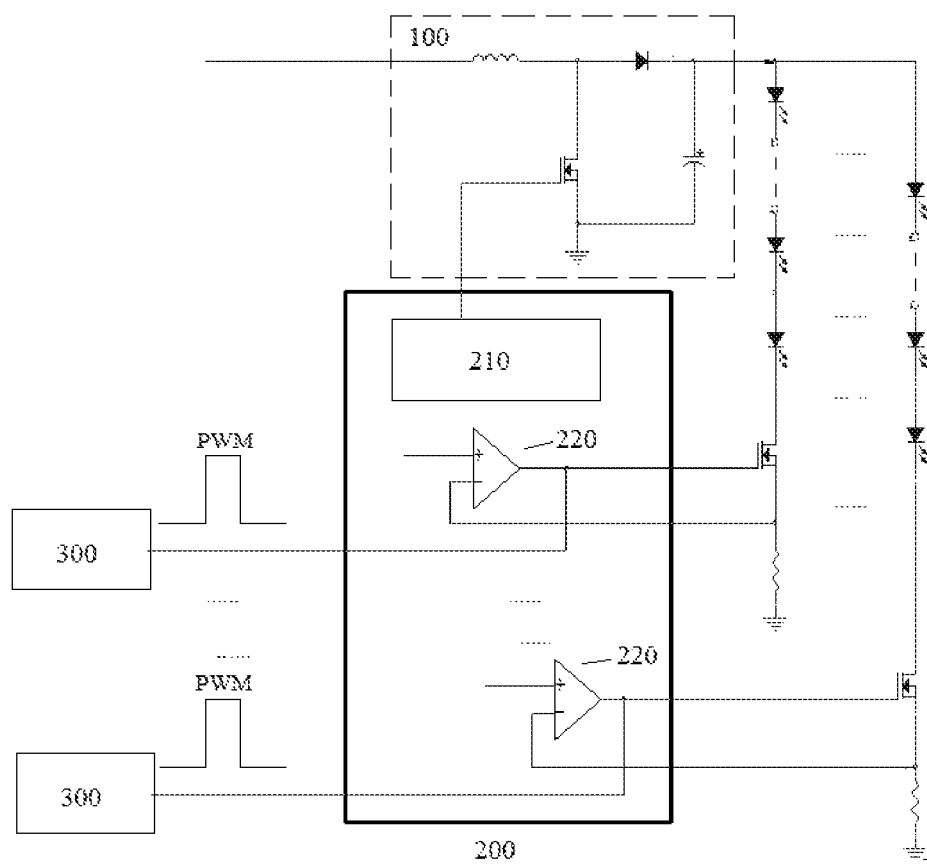
FIG. 2 is a diagram of partial structure of one embodiment of the backlight drive circuit according to the present disclosure.

FIG. 2 is a diagram of the partial structure of the backlight drive circuit according to one embodiment of the present disclosure, which includes one DC converter 100, a plurality of LED backlight drive units 200 and a plurality of pulse dimming signal units 300. The LED backlight drive units are integrated into a LED constant current driver chip. The LED constant current driver chip further includes one control module 210 and a plurality of comparison modules 220.

In this circuit, an input terminal of the DC converter 100 is electrically connected to a DC power supply (not shown), and an output terminal thereof electrically connects with anodes of light strips in each of the backlight partitions, and a control terminal of the DC converter 100 is electrically connected to the control module 210 in the LED backlight drive unit 200. In this way, a DC voltage output by the DC power supply is converted, according to a control signal output by the control module 210, into a DC driving voltage required for operation of the LED strips, and thereby supplied to respective LED strips. Thus, the anodes of respective LED strips may be electrically connected with one another, and then electrically connected together to the output terminal of the DC converter 100, so as to receive the DC driving voltage from the DC converter 100. Meanwhile, the cathodes of respective LED strips are electrically grounded through a first terminal and a second terminal of a correlative switch transistor MOSFET and through a voltage dividing resistor R.

In the LED backlight drive unit 200, each of the comparison modules 220 can be electrically connected via its positive input terminal to a DC reference voltage unit (not shown) for receiving a DC reference voltage Vref, and a negative input terminal thereof can be electrically connected between the switch transistor MOSFET correlated with the controlled LED strips and the voltage dividing resistor R for receiving a feedback voltage Vfb from the controlled LED strips, so that a corresponding modulation signal is output in terms of a difference between the DC reference voltage Vref and the feedback voltage Vfb. Each of the comparison modules 220 is electrically connected via its output terminal to a control terminal of the switch transistor MOSFET correlated with the controlled LED strips, which control terminal, at the same time, is electrically connected to the pulse dimming signal unit 300 to receive a pulse dimming signal PWM. Then, the switch transistor MOSFET is turned on under the action of the pulse dimming signal PWM, and a magnitude of the current flowing through this transistor depends on the duty cycle of the pulse dimming signal PWM. That is, the LED strips are actuated under the action of the pulse dimming signal PWM, and the brightness of the LED strips is determined in terms of the duty cycle of the pulse dimming signal PWM.

In the prior art, since the LED strips controlled by one LED backlight drive unit are gathered into one and the same backlight partition, according to the scanning principle of the above-mentioned liquid crystal display device, output terminals of all comparison modules in one LED backlight drive unit may be electrically connected to one another, and then electricity connected to an output terminal of one pulse dimming signal unit, to receive the same pulse dimming signal PWM. However, in the present disclosure, since the LED strips controlled by one LED backlight drive unit are distributed across all of the backlight partitions in an even manner, one LED backlight drive unit has to be electrically connected to all of the pulse dimming signal units in order to achieve the same function as in the prior art. In other words, in a specific application, the number of the comparison modules in each LED backlight drive unit must be greater than or equal to that of the pulse dimming signal units, i.e., greater than or equal to the number of the backlight partitions, and the various output terminals of the comparison modules are connected respectively to the different pulse dimming signal units, so as to receive different pulse dimming signals PWM.

Based on the above technical principle, provided in the present disclosure is a new backlight drive circuit, comprising: a plurality of light emitting cells, divided into several backlight partitions in an even manner; pulse dimming signal units of a same number with the backlight partitions, each of the pulse dimming signal units outputting a pulse dimming signal; and a plurality of backlight drive units, each of which is electrically connected to all of the pulse dimming signal units to receive respective pulse dimming signals output by the pulse dimming signal units, and meanwhile each of which is further electrically connected to an identical number of light emitting cells in all the backlight partitions. When a pulse dimming signal is output from a pulse dimming signal unit, all of the backlight drive units supply power to a backlight partition, such that the light emitting cells to which each backlight drive unit is individually connected in said backlight partition are actuated to emit light.

In the above circuit, each backlight driving unit is electrically connected to one or more light emitting cells of a backlight partition. The light emitting cell is a light strip formed of a plurality of light emitting diodes in series connection to one another.

Figure 3:
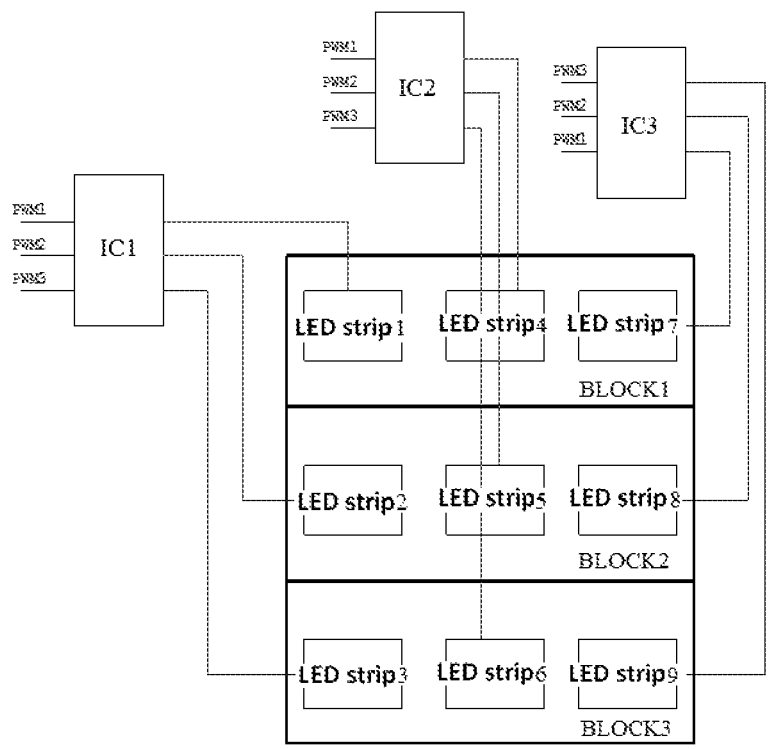
FIG. 3 is a diagram of partial structure of one preferred embodiment of the backlight drive circuit according to the present disclosure.

FIG. 3 is a diagram of the partial structure of a preferred embodiment of the backlight drive circuit according to the present disclosure. In this embodiment, each of the backlight drive units is electrically connected to one LED strip in each of the backlight partitions. In this case, the number of the backlight drive units is identical with the number of LED strips in each of the backlight partitions. Then, the operating pattern of the circuit will be described below in detail.

It is assumed that m×n LED strips are used as a light source in a large-sized LCD panel. These LED strips are divided, with every m strips as a group, into n backlight partitions, i.e., BLOCK1, BLOCK2 to BLOCKn. Accordingly, in this embodiment, the backlight drive circuit includes at least n pulse dimming signal units, i.e., PWM1, PWM2 to PWMn, and at least m backlight drive units, i.e., IC1, IC2 to ICm. For the sake of simplicity, the figure shows only a part of the circuit. Of course, the backlight drive circuit may further include other unit modules, e.g., the above-mentioned DC converter 100, which will not be described herein any further as they belong to the prior art instead of the technique concerns of the present disclosure. In the backlight drive circuit, each of the backlight drive units is in electrical connections with all of the pulse dimming signal units PWM1, PWM2 to PWMn. At the same time, each backlight drive unit is also in electrical connections with one LED strip in each of the backlight partitions, including BLOCK1, BLOCK2, to BLOCKn.

As such, it allows the pulse dimming signal units PWM1, PWM2 to PWMn to, respectively, correspond to these backlight partitions BLOCK1, BLOCK2 to BLOCKn in a one-to-one pattern. Whenever a particular pulse dimming signal unit outputs a pulse dimming signal, the backlight partition correlated with this pulse dimming signal unit may emit light, so as to enable the backlight partitions to be lightened in a pattern like in the prior art. Furthermore, since the backlight drive units are each connected to the same number of light emitting cells (in this embodiment, LED strips) in one backlight partition, they will each supply equal or roughly equal amounts of power when the particular backlight partition is lightened.

Figure 4:
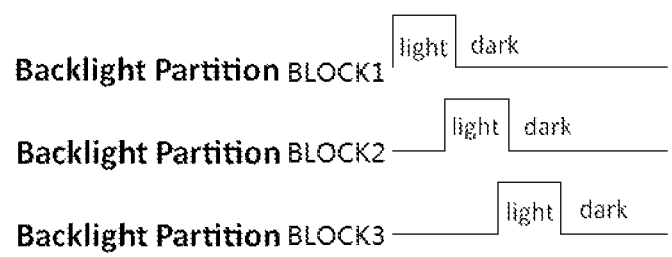
FIG. 4 is a diagram of a pulse dimming signal output by a pulse dimming signal unit of FIG. 3.

Briefly, the LED strips in each backlight partition are actuated by the different backlight drive units but emit light according to the same pulse dimming signal. Further explanation will be made below with examples of FIGS. 3 and 4.

In the backlight partition BLOCK1, the LED strips 1, 4, 7 are actuated by the backlight drive units IC1, IC2, IC3 respectively, but they perform light emission identically based on a pulse dimming signal output from the pulse dimming signal unit PWM1.

In the backlight partition BLOCK2, the LED strips 2, 5, 8 are actuated by the backlight drive units IC1, IC2, IC3 respectively, but they perform light emitting operations identically based on a pulse dimming signal output from the pulse dimming signal unit PWM2.

In the backlight partition BLOCK3, the LED strips 3, 6, 9 are actuated by the backlight drive units IC1, IC2, IC3 respectively, but they perform light emission identically based on a pulse dimming signal output from the pulse dimming signal unit PWM3.

Apparently, in the above embodiments, unlike in the prior art, LED strips controlled by one backlight drive unit are no longer gathered into one and the same backlight partition, but distributed in various backlight partitions in an even pattern. The LED strips of one backlight partition are electrically connected to the different backlight drive units and driven thereby. In this case, when the backlight partitions are scanned, from top to bottom, in the liquid crystal panel one by one, all of the backlight drive units in the backlight drive circuit may operate at the same time, so that the backlight partitions are lightened in order. Moreover, when a certain backlight partition emits light, all the backlight drive units may supply it with equal or roughly equal amounts of power. Therefore, the respective backlight drive units have no difference in their operating conditions with one another, and thus the LED backlight drive circuit system may operate stably without any circuit abnormality caused by the condition difference of the prior art.

In the above-described embodiments, although the liquid crystal display device applies the LED backlight technology, it is clear that the present disclosure is not limited thereto and may be applicable to other types of light sources. The foregoing is only the preferred specific embodiments of the present disclosure, but the scope of the present disclosure is not limited thereto. Any modifications and variations readily conceivable to a person skilled in the art based on the technical scope of the disclosure disclosed should fall into the scope of the present disclosure. Therefore, the scope of the present disclosure should be subjected to the scope defined by the patent claims.

The invention claimed is:
1. A backlight drive circuit, comprising:
a plurality of light emitting cells, divided into several backlight partitions in an even manner;
pulse dimming signal units of a same number with the backlight partitions, each of the pulse dimming signal units outputting a pulse dimming signal; and
a plurality of backlight drive units, each of which is electrically connected to all of the pulse dimming signal units to receive respective pulse dimming signals output by the pulse dimming signal units, and meanwhile each of which is further electrically connected to an identical number of light emitting cells in all the backlight partitions, wherein, when a pulse dimming signal is output from one of the pulse dimming signal units, all of the backlight drive units supply power to their respectively connected light emitting cells in a corresponding one of the backlight partitions, so as to drive said light emitting cells to emit light.

2. A backlight drive circuit of claim 1, wherein all of the backlight drive units supply identical power to their respectively connected light emitting cells in said backlight partition, so as to drive said light emitting cells to emit light.

3. A backlight drive circuit of claim 2, wherein each of the backlight drive units is electrically connected to one or more light emitting cells in each of the backlight partitions.

4. A backlight drive circuit of claim 3, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

5. A backlight drive circuit of claim 2, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

6. A backlight drive circuit of claim 1, wherein each of the backlight drive units is electrically connected to one or more light emitting cells in each of the backlight partitions.

7. A backlight drive circuit of claim 6, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

8. A backlight drive circuit of claim 1, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

9. A backlight drive circuit of claim 8, wherein the light emitting cell is a light strip composed of a plurality of light emitting diodes in series connection to one another.

10. A backlight drive circuit of claim 9, wherein an anode of the light emitting cell is electrically connected to the DC converter, and a cathode thereof is electrically connected to a first terminal of a switch transistor, a second terminal of the switch transistor being electrically grounded via a voltage dividing resistor and a control terminal thereof being electrically connected to an output terminal of the backlight drive unit.

11. A backlight drive circuit of claim 10, wherein one input terminal of the backlight drive unit is further electrically connected to the second terminal of the switch transistor to obtain a feedback voltage from the light emitting cells.

12. A method for driving a backlight drive circuit, comprising steps of:

dividing light emitting cells into several backlight partitions in an even manner; and supplying, by all of the backlight drive units, when a pulse dimming signal is output from a pulse dimming signal unit, electrical power to their respectively connected light emitting cells in a corresponding backlight partition, so as to drive the light emitting cells to emit light.

13. A liquid crystal display device comprising a backlight drive circuit, the backlight drive circuit comprising:

a plurality of light emitting cells, divided into several backlight partitions in an even manner;

pulse dimming signal units of a same number with the backlight partitions, each of the pulse dimming signal units outputting a pulse dimming signal; and a plurality of backlight drive units, each of which is electrically connected to all of the pulse dimming signal units to receive respective pulse dimming signals output by the pulse dimming signal units, and meanwhile each of which is further electrically connected to an identical number of light emitting cells in all the backlight partitions, wherein, when a pulse dimming signal is output from one of the pulse dimming signal units, all of the backlight drive units supply power to their respectively connected light emitting cells in a backlight partition, so as to drive said light emitting cells to emit light.

14. A liquid crystal display device of claim 13, wherein each of the backlight drive units is electrically connected to one or more light emitting cells in each of the backlight partitions.

15. A liquid crystal display device of claim 14, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

16. A liquid crystal display device of claim 13, further comprising a DC converter, which is electrically connected to a DC power supply, the light emitting cells and the backlight drive units, such that a DC voltage supplied by the DC power supply, under control of the backlight drive unit, is converted into a DC driving voltage required for operation of the light emitting cells, and then supplied to the light emitting cells.

17. A liquid crystal display device of claim 16, wherein the light emitting cell is a light strip composed of a plurality of light emitting diodes in series connection to one another.

18. A liquid crystal display device of claim 17, wherein an anode of the light emitting cell is electrically connected to the DC converter, and a cathode thereof is electrically connected to a first terminal of a switch transistor, a second terminal of the switch transistor being electrically grounded via a voltage dividing resistor and a control terminal thereof being electrically connected to an output terminal of the backlight drive unit.

19. A liquid crystal display device of claim 18, wherein one input terminal of the backlight drive unit is further electrically connected to the second terminal of the switch transistor to obtain a feedback voltage from the light emitting cells.

* * * * *